(12) United States Patent
Shinohara

(10) Patent No.: US 6,985,309 B2
(45) Date of Patent: Jan. 10, 2006

(54) IMAGING LENS

(75) Inventor: Yoshikazu Shinohara, Saitama (JP)

(73) Assignee: Fujinon Corporation, Saitama (JP)

(*) Notice: Subject to any disclaimer, the term of this patent is extended or adjusted under 35 U.S.C. 154(b) by 96 days.

(21) Appl. No.: 10/810,609

(22) Filed: Mar. 29, 2004

(65) Prior Publication Data
US 2004/0196571 A1 Oct. 7, 2004

(30) Foreign Application Priority Data
Mar. 31, 2003 (JP) ............................. 2003-094149

(51) Int. Cl.
G02B 9/34 (2006.01)
G02B 13/18 (2006.01)

(52) U.S. Cl. ...................... 359/783; 359/715
(58) Field of Classification Search ........ 359/713–715, 359/770, 781, 783
See application file for complete search history.

(56) References Cited

U.S. PATENT DOCUMENTS 5,999,337 A * 12/1999 Ozaki .......................... 359/793
6,222,685 B1 * 4/2001 Yamada ....................... 359/770
6,417,975 B1 7/2002 Isono
6,825,993 B2 * 11/2004 Noda ........................... 359/749
6,867,933 B2 * 3/2005 Matsusaka ................... 359/783

FOREIGN PATENT DOCUMENTS

JP 2001-21800 1/2001
JP 2001-100092 4/2001

* cited by examiner

Primary Examiner—Scott J. Sugarman
(74) Attorney, Agent, or Firm—Arnold International; Jon W. Henry; Bruce Y. Arnold

(57) ABSTRACT

An imaging lens includes, in order from the object side: a first lens component of negative refractive power with two aspheric surfaces including a concave surface near the optical axis on the image-side; a second lens component of positive refractive power with a convex surface on the object side; a third lens component having positive refractive power and including lens elements having positive and negative refractive powers; and a fourth lens component having an aspheric surface on the image side that is convex near the optical axis and is concave at the periphery. The imaging lens satisfies a specified condition to assure a sufficient back focus for insertion of additional optical elements, a sufficiently small imaging lens diameter, and favorable correction of aberrations. The imaging lens has a wide picture angle, consists of only 5 lens elements in the disclosed embodiments, and is particularly suited for a text imaging camera.

20 Claims, 3 Drawing Sheets

Spherical Aberration

Astigmatism

Distortion

Spherical Aberration

Astigmatism

Distortion

Spherical Aberration

Astigmatism

Distortion

IMAGING LENS

BACKGROUND OF THE INVENTION

Systems used to electronically capture a picture image using an image pickup device, such as a text imaging camera, are well known. For example, a presentation system is well known that uses a text imaging camera to form an image of a written document, or similar document, as an electronic image and then displays a greatly enlarged version of this image using a device that provides a greatly enlarged image, such as a projector. Additionally, this image may be sent through a teleconferencing system that includes a communications network in order to display versions of this image at various remote locations.

With image pickup devices such as a text imaging camera, an image pickup device such is a CCD (Charged Coupled Device) or a CMOS (Complementary Metal Oxide Semiconductor) is used. Imaging lenses for use with such image pickup devices have been developed for use in digital cameras. For example, Japanese Laid-Open Patent Application 2001-021800 and Japanese Laid-Open Patent Application 2001-100092 disclose imaging lenses developed mainly for use in digital cameras and that include five lens elements with some aspheric surfaces in the lens system.

However, with a presentation system that uses a text imaging camera, as described above, an original written document having characters and similar finely detailed information on it must be imaged in the text imaging camera with high optical resolution in order for a final highly enlarged projected image to be a close replica of the original written document. Additionally, because the original written document is imaged at close range and in order to be compatible with a large document, a wider picture angle, that is, a wider field angle of the imaging lens than an ordinary digital camera provides is needed. The suppression of distortion aberration with high resolution is especially difficult, but necessary, with a wide picture angle provided by a wide-angle imaging lens in a text imaging camera or similar device.

In order to satisfy the above requirements, the number of lens elements and lens components used tends to increase, including, for example seven lens elements, in order to suppress aberrations, especially distortion aberration. With this increase, the outer diameters of the lens elements, along with the total length and weight of the entire optical system, tend to increase. However, in recent years, peripheral components for mounting an imaging lens on the image pickup device side have been getting smaller, and this necessitates making the accompanying imaging lens system smaller as well.

The imaging lenses in the two Japanese applications discussed above use a comparatively small number of lens elements, only five, and the correction of aberrations is comparatively favorable, based on their use of aspheric surfaces. However, the lenses described in these Japanese applications are designed for use primarily in digital cameras and not adequately suited for a wide picture angle as needed in a text imaging camera. Furthermore, because the imaging lens of Japanese Laid-Open Patent Application 2001-100092 uses an aspheric surface in a cemented lens component, the imaging lens is expensive to manufacture, making it impractical for mass production.

BRIEF SUMMARY OF THE INVENTION

The present invention relates to an imaging lens having favorable optical performance, a wide picture angle, and is relatively compact. The present invention further relates to an imaging lens designed for use with an image pickup device in a text imaging camera or a similar apparatus.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
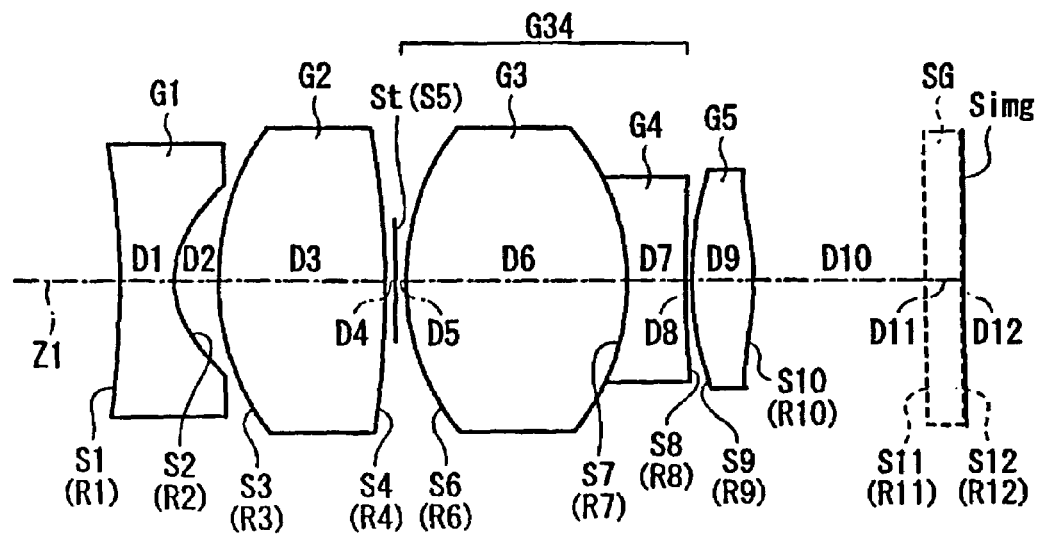
FIG. 1 shows a cross-sectional view of the imaging lens according to Embodiment 1.

A general description of the imaging lens of the present invention will first be described with reference to FIG. 1 that shows Embodiment 1. In FIG. 1, lens elements are referenced by the letter G followed by a number denoting their order from the object side of the imaging lens along the optical axis Z1, from G1 to G5. The symbol G34 accompanies a horizontal bracket that includes lens elements G3 and G4, indicating that these two lens elements form a lens component.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

As shown in FIG. 1, the on-axis surface spacings of all of the optical surfaces of the optical elements are referenced by the letter D followed by a number denoting their order from the object side of the imaging lens along the optical axis Z1, from D1 to D12. Similarly, optical element surfaces, including the lens surfaces, are referenced by the letter S followed by a number denoting their order from the object side of the imaging lens, from S1 to S12, and the radii of curvature of optical element surfaces, including lens surfaces, are referenced by the letter R followed by a number denoting their order from the object side of the imaging lens, from R1 to R12, that parenthetically accompany the lens surface references.

The imaging lens of the present invention is particularly suited for use in a text imaging camera for imaging nearby objects so that the images produced can be projected into an enlarged image, for example, on a projection screen. In all disclosed embodiments of the present invention, the imaging lens includes only four lens components and five lens elements.

As shown in FIG. 1, a diaphragm stop St (at surface S5) is arranged between the second lens G2 and the third lens G3. In addition, an imaging device such as a CCD (not shown) is placed on the image formation plane Simg (hereinafter simply image plane) on the image side of the imaging lens. A parallel flat plate SG may also be inserted as a cover glass for protecting the optical filter and the imaging device. In addition to the cover glass SG, other optical elements, such as an infrared cut-off filter and/or a low-pass filter may also be arranged between the fifth lens element G5 and the image plane Simg.

As shown in FIG. 1, the imaging lens includes a first lens element G1 of negative refractive power with an object-side surface S1 and an image-side surface S2 that are concave near the optical axis. Both surfaces S1 and S2 of the first lens element G1 are aspheric. The term "near the optical axis" is herein defined as a central region of the imaging lens surface that surrounds the optical axis but excludes a substantial peripheral region surrounding the central region, which is herein defined as the "periphery" of the imaging lens surface. At the periphery, the curvature of a lens surface and the refractive power of the lens element may or may not be of the same magnitude or even of the same sign, that is, either positive or negative in sign, as at the central region that is near the optical axis. The sign of the curvature and the sign of the refractive power of a lens surface change at a point of inflection on the lens surface. The point of inflection is the point at which the center of curvature from which the radius of curvature, indicated by a vector perpendicular to the curving lens surface from the center of curvature, is measured changes from one side of the lens surface to the other as the tip of the vector on the lens surface moves outwardly away from the optical axis or inwardly toward the optical axis. For example, if a vector with a component toward the object side is positive, at a point of inflection, the vector changes to have a component toward the image side and becomes negative. Therefore, for example, the phrase, "the aspheric surface S10 on the image side is convex near the optical axis and becomes concave at the periphery" in the present invention means that the central portion, i.e., the portion centered on the optical axis, of the image-side lens surface is convex on the image side and that the radius of curvature of the image-side lens surface continuously changes so that its absolute value of curvature gradually decreases as the tip of the vector approaches a point of inflection in a direction from the center of the lens surface, and it further means that as the point of inflection is passed, the sign of the curvature as well as the sign of the radius of curvature change, indicating a change of the lens surface to a concave shape on the image side at the periphery (i.e., outside the central portion).

As shown in FIG. 1, the second lens element G2 is biconvex with lens surfaces S3 and S4, and the third lens element G3 is also biconvex with an object-side surface S6 and an image-side surface S7. The image-side surface of the third lens element G3 is intimately bonded to the object-side surface of the fourth lens element G4 (that is biconcave) so as to form a lens component, which is indicated by the symbol G34 and the bracket in FIG. 1. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together, the latter being commonly referred to as a "cemented" lens element arrangement.

As shown in FIG. 1, the fifth lens element G5 is biconvex near the optical axis. Both lens surfaces S9 and S10 of the fifth lens element G5 are aspheric. The aspheric surface S9 on the object side is convex near the optical axis and the aspheric surface S10 on the image side is convex near the optical axis and becomes concave at the periphery.

The lens surfaces that are aspheric are defined using the following equation:

$$Z=[(C \cdot Y^2)/\{1+(1-K \cdot C^2 \cdot Y^2)^{1/2}\}]+\Sigma(A i \cdot |Y^i|) \qquad \text{Equation (A)}$$

where
- Z is the length (in mm) of a line drawn from a point on the aspheric lens surface at a distance Y from the optical axis to the tangential plane of the aspheric surface vertex,
- C is the curvature (=1/the radius of curvature, R) of the aspheric lens surface on the optical axis,
- Y is the distance (in mm) from the optical axis,
- K is the eccentricity,
- $A_i$ is the ith aspheric coefficient, and the summation extends over i.

In embodiments of the invention disclosed below, only aspheric coefficients $A_4$, $A_6$, $A_8$, and $A_{10}$ are non-zero.

The imaging lens satisfies the following condition:

$$-1.0<(P1+P5)/P<-0.4 \qquad \text{Condition (1)}$$

where
- P1 is the refractive power of the first lens element G1 (=1/the focal length of the first lens element G1),
- P5 is the refractive power of the fifth lens element G5 (=1/the focal length of the fifth lens element G5), and
- P is the refractive power of the entire imaging lens (=1/the focal length of the entire imaging lens).

With regard to Condition (1), generally, with an optical system that uses an imaging device, it is common that optical elements such as an infrared cut-off filter and a cover glass are placed between the image-side lens surface of the imaging lens and the image pickup device. In order to provide space for such optical elements, an adequate back focus distance is necessary. By satisfying Condition (1), a good balance between the outer diameters of the lens elements used in the imaging lens and the back focus distance, in this case the distance between the image-side lens surface S10 of the fifth lens element G5 and the image plane Simg, that is, the sum of optical element spacings D10, D11, and D12, can be assured. If the ratio of Condition (1) is less than the lower limit of Condition (1), the negative refractive power of the first lens element G1 becomes too strong to favorably correct aberrations with lens elements of small outer diameters. On the other hand, if the ratio of Condition (1) is greater than the upper limit of Condition (1), the refractive power of the fifth lens element G5 relative to the refractive power of the first lens element G1 becomes too strong, making it difficult to obtain an adequate back focus distance.

The first through fifth lenses G1–G5 may use an optical glass or an optical resin, that is, plastic, as the lens material. However, because the fifth lens element G5 significantly contributes to aberration correction, as compared to the other lens elements G1–G4, it is preferred that the fifth lens element G5 be constructed from optical glass. This is because optical glass has properties related to optical performance that are less affected by temperature variations than plastic. These properties of optical glass, as compared to plastics, are termed 'temperature resistant' properties in view of the optical performance of lens elements made of optical glass varying less with temperature changes than with plastics. That is, by using optical glass as the lens element material, characteristics such as the focal distance of the imaging lens vary only slightly with normal changes in ambient temperature.

Additionally, the shapes of the lens surfaces of the lens elements G1–G5 can be varied, as taught with regard to the embodiments described below, based on the particular application, optical performance required, and the properties of the image pickup device being used. Particularly, by making both lens surfaces of each of the first lens element G1 and the fifth lens element G5 aspheric, the number of lens elements and lens components required can be reduced in comparison to prior art imaging lenses of comparable optical performance. In addition, by making the lens surfaces S9 and S10 of the fifth lens element G5, which is the lens placed to the extreme image side of the imaging lens, to be aspheric and convex near the optical axis, high resolution performance and low distortion can be maintained across a wide field angle. In this manner, the fifth lens element G5 significantly contributes to the correction of aberrations.

Especially, as mentioned above, by using an optical glass for the fifth lens element G5, optical properties are less affected by temperature than when using plastic. For example, when plastic having a large coefficient of thermal expansion is used, the lens element will change shape due to changes in ambient temperature, thereby increasing the distortion. However, when optical glass is used, the deterioration of optical performance due to changes in ambient temperature is reduced.

By constructing the imaging lens as described above, including satisfying Condition (1), favorable optical performance particularly Suitable for a text imaging camera can be achieved. Also, especially by making the first lens element G1 so as to have negative refractive power and the second lens element G2 so as to have positive refractive power, the diameters of the lens elements can be kept small and the imaging lens can be miniaturized. Furthermore, by intimately bonding the third lens element G3 and the fourth lens element G4 so as to form the lens component G34 of FIG. 1, chromatic aberration can be reduced.

Embodiments 1–3 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $\nu_d$ (both at the d-line of 587.6 nm) of each optical element for Embodiment 1.

TABLE 1

| # | R | D | $N_d$ | $\nu_d$ |
|---|---|---|---|---|
| 1* | −9.32 | 0.30 | 1.51 | 56.0 |
| 2* | 0.46 | 0.24 | | |
| 3 | 1.41 | 0.90 | 1.62 | 36.3 |
| 4 | −5.35 | 0.06 | | |
| 5 | ∞ (stop) | 0.06 | | |
| 6 | 1.32 | 1.21 | 1.75 | 52.3 |
| 7 | −1.32 | 0.32 | 1.85 | 23.8 |
| 8 | 7.61 | 0.04 | | |
| 9* | 2.45 | 0.33 | 1.51 | 56.0 |
| 10* | −1.28 | 0.95 | | |
| 11 | ∞ | 0.20 | 1.52 | 64.1 |
| 12 | ∞ | 0.02 | | |

The surfaces with a * to the right of the surface number in Table 1 are aspheric lens surfaces, and the aspheric surface shape is expressed by Equation (A) above.

Table 2 below lists the values of the constants K, $A_4$, $A_6$, $A_8$, and $A_{10}$ used in Equation (A) for each of the aspheric lens surfaces of Table 1. Aspheric coefficients that are not present in Table 2 are zero. An "E" in the data indicates that the number following the "E" is the exponent to the base 10. For example, "1.0E–2" represents the number $1.0 \times 10^{-2}$.

TABLE 2

| # | K | $A_4$ | $A_6$ | $A_8$ | $A_{10}$ |
|---|---|---|---|---|---|
| 1 | −3.50E−6 | −1.47E−1 | 2.71E−2 | 2.66E−1 | −2.63E−1 |
| 2 | 5.19E−1 | −6.36E−1 | −4.30 | 1.60E+1 | −3.34E+1 |
| 9 | 1.00 | 1.99E−1 | −1.75E−1 | 2.86 | −8.24 |
| 10 | −8.25E−1 | 6.23E−1 | −4.31E−1 | 5.50 | −1.11E+1 |

The imaging lens of Embodiment 1 satisfies Condition (1) with the value of (P1+P5)/P being equal to minus 0.58.

Figure 4A:
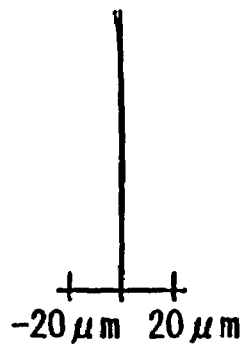
FIGS. 4A–4C show the spherical aberration, astigmatism, and distortion, respectively, of the imaging lens according to Embodiment 1.
Figure 4B:
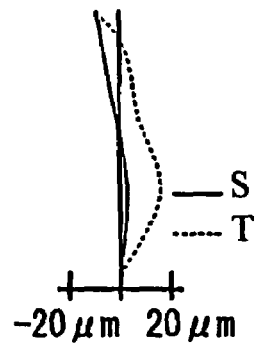
Figure 4C:
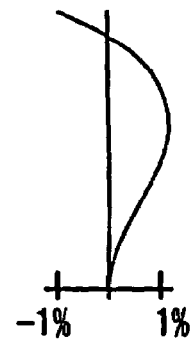

FIGS. 4A–4C show the spherical aberration, astigmatism, and distortion, respectively, of the imaging lens according to Embodiment 1. Aberrations are shown for the d-line (λ=587.6 nm). As shown in FIG. 4A, the f-number is 2.81. In FIG. 4B, the astigmatism is shown for both the sagittal image surface S and the tangential image surface T. The half-field angle ω for FIGS. 4B and 4C is 39.3°.

As is clear from the lens data and aberration curves discussed above, in Embodiment 1 the various aberrations are favorably corrected, and performance capabilities, including a wide picture angle, that is, a wide field angle, suitable for use in a text imaging camera are achieved.

Embodiment 2

Figure 2:
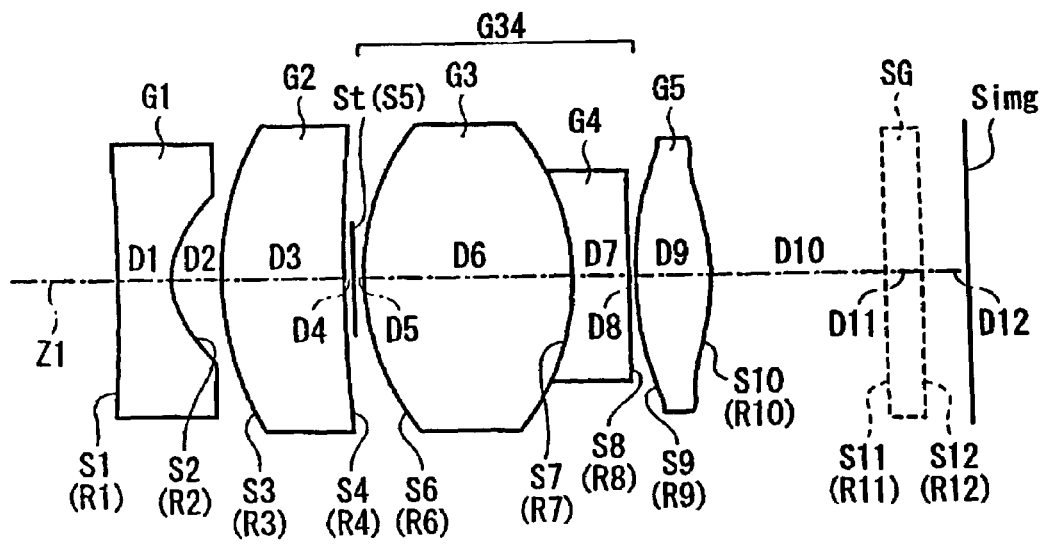
FIG. 2 shows a cross-sectional view of the imaging lens according to Embodiment 2.

FIG. 2 shows Embodiment 2 of the present invention. Embodiment 2 differs from Embodiment 1 in that the image-side surface S4 of the second lens element G2 is concave rather the convex as in Embodiment 1. Table 3 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2.

TABLE 3

| # | R | D | $N_d$ | $v_d$ |
|---|---|---|---|---|
| 1* | −11.18 | 0.30 | 1.51 | 56.0 |
| 2* | 0.47 | 0.27 | | |
| 3 | 1.66 | 0.66 | 1.73 | 28.6 |
| 4 | 8.96 | 0.06 | | |
| 5 | ∞ (stop) | 0.06 | | |
| 6 | 1.31 | 1.14 | 1.74 | 54.5 |
| 7 | −1.31 | 0.30 | 1.85 | 22.8 |
| 8 | 48.38 | 0.04 | | |
| 9* | 2.29 | 0.40 | 1.51 | 56.0 |
| 10* | −1.12 | 0.95 | | |
| 11 | ∞ | 0.20 | 1.52 | 64.1 |
| 12 | ∞ | 0.26 | | |

The surfaces with a * to the right of the surface number in Table 3 are aspheric lens surfaces, and the aspheric surface shape is expressed by Equation (A) above.

Table 4 below lists the values of the constants K, $A_4$, $A_6$, $A_8$, and $A_{10}$ used in Equation (A) for each of the aspheric lens surfaces of Table 3. Aspheric coefficients that are not present in Table 4 are zero. An "E" in the data indicates that the number following the "E" is the exponent to the base 10. For example, "1.0E−2" represents the number $1.0 \times 10^{-2}$.

TABLE 4

| # | K | $A_4$ | $A_6$ | $A_8$ | $A_{10}$ |
|---|---|---|---|---|---|
| 1 | −4.10E−6 | 1.61E−1 | −7.23E−1 | 1.31 | −8.83E−1 |
| 2 | 5.22E−1 | −1.43E−1 | −3.78 | 1.09E+1 | −2.16E+1 |
| 9 | 1.00 | 1.10E−1 | 4.06E−2 | 1.37 | −3.00 |
| 10 | −8.25E−1 | 4.20E−1 | −6.55E−1 | 4.59 | −6.25 |

The imaging lens of Embodiment 2 satisfies Condition (1) with the value of (P1+P5)/P being equal to minus 0.48.

Figure 5A:
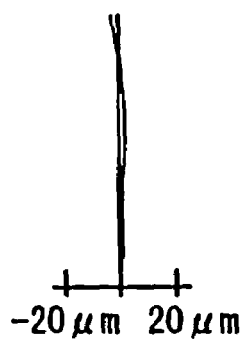
FIGS. 5A–5C show the spherical aberration, astigmatism, and distortion, respectively, of the imaging lens according to Embodiment 2.
Figure 5B:
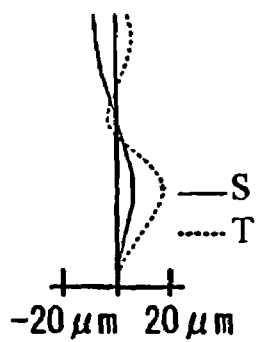
Figure 5C:
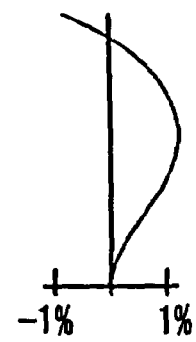

FIGS. 5A–5C show the spherical aberration, astigmatism, and distortion, respectively, of the imaging lens according to Embodiment 2. Aberrations are shown for the d-line (λ=587.6 nm). As shown in FIG. 5A, the f-number is 2.81. In FIG. 5B, the astigmatism is shown for both the sagittal image surface S and the tangential image surface T. The half-field angle ω for FIGS. 5B and 5C is 39.3°.

As is clear from the lens data and aberration curves discussed above, in Embodiment 2 the various aberrations are favorably corrected, and performance capabilities, including a wide picture angle, that is, a wide field angle, suitable for use in text imaging camera are achieved.

Embodiment 3

Figure 3:
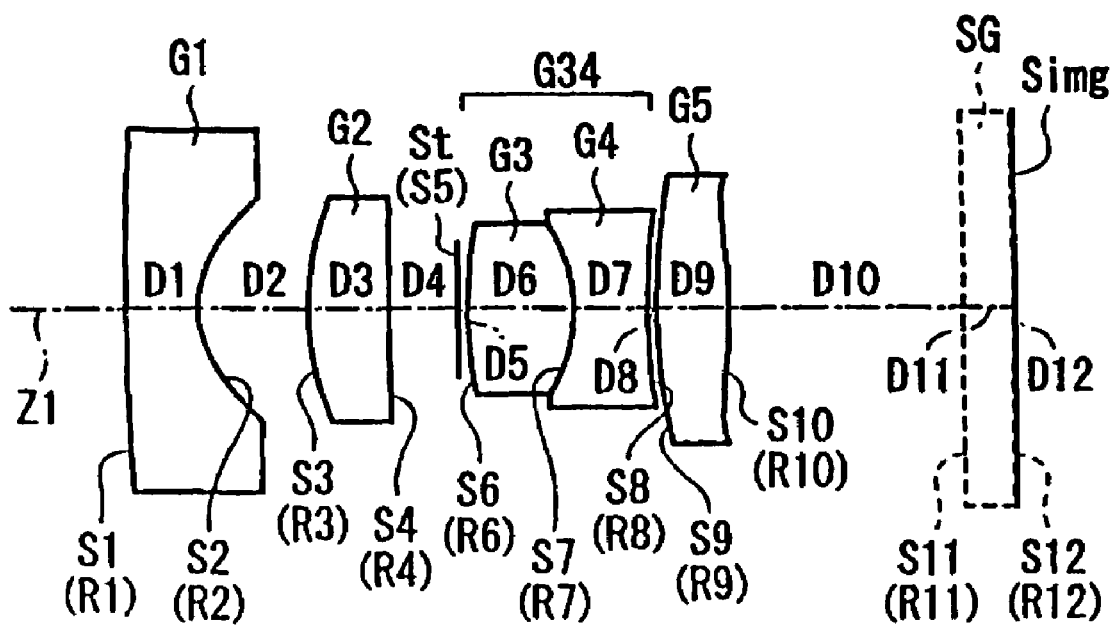
FIG. 3 shows a cross-sectional view of the imaging lens according to Embodiment 3.

FIG. 3 shows Embodiment 3 of the present invention. Embodiment 3 differs from Embodiment 1 in that the object-side surface S1 of the first lens element G1 is convex rather than concave as in Embodiment 1 (as well as in Embodiment 2), in that the image-side surface S4 of the second lens element G2 is concave (as in Embodiment 2) rather than convex as in Embodiment 1, and in that the object-side lens surface S9 of lens element G5 is spherical rather than aspheric as in Embodiment 1 (as well as in Embodiment 2). Table 5 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 3.

TABLE 5

| # | R | D | $N_d$ | $v_d$ |
|---|---|---|---|---|
| 1* | 7.50 | 0.30 | 1.53 | 55.5 |
| 2* | 0.46 | 0.45 | | |
| 3 | 1.18 | 0.33 | 1.82 | 36.1 |
| 4 | 15.17 | 0.28 | | |
| 5 | ∞ (stop) | 0.04 | | |
| 6 | 1.57 | 0.43 | 1.82 | 46.2 |
| 7 | −0.66 | 0.30 | 1.75 | 27.3 |
| 8 | 2.38 | 0.04 | | |
| 9 | 2.67 | 0.30 | 1.53 | 55.5 |
| 10* | −1.64 | 0.95 | | |
| 11 | ∞ | 0.20 | 1.52 | 64.1 |
| 12 | ∞ | 0.01 | | |

The surfaces with a * to the right of the surface number in Table 5 are aspheric lens surfaces, and the aspheric surface shape is expressed by Equation (A) above.

Table 6 below lists the values of the constants K, $A_4$, $A_6$, $A_8$, and $A_{10}$ used in Equation (A) for each of the aspheric lens surfaces of Table 5. Aspheric coefficients that are not present in Table 6 are zero. An "E" in the data indicates that the number following the "E" is the exponent to the base 10. For example, "1.0E−2" represents the number $1.0 \times 10^{-2}$.

TABLE 6

| # | K | $A_4$ | $A_6$ | $A_8$ | $A_{10}$ |
|---|---|---|---|---|---|
| 1 | 3.00E−7 | −1.63E−2 | −1.43E−2 | 6.01E−2 | −3.57E−2 |
| 2 | 5.73E−1 | −1.67E−1 | −1.52 | 4.16 | −1.57E+1 |
| 10 | −8.25E−1 | 5.46E−1 | 1.65 | −4.55 | 8.69 |

The imaging lens of Embodiment 3 satisfies Condition (1) with the value of (P1+P5)/P being equal to minus 0.56.

Figure 6A:
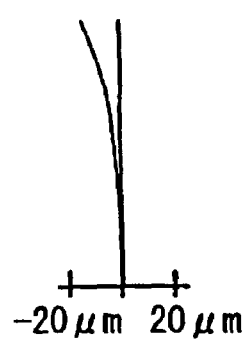
FIGS. 6A–6C show the spherical aberration, astigmatism, and distortion, respectively, of the imaging lens according to Embodiment 3.
Figure 6B:
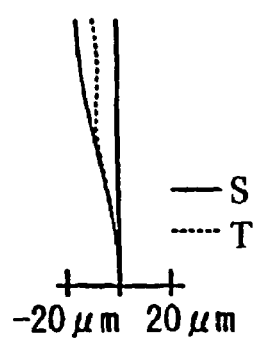
Figure 6C:

FIGS. 6A–6C show the spherical aberration, astigmatism, and distortion, respectively, of the imaging lens according to Embodiment 3. Aberrations are shown for the d-line (λ=587.6 nm). As shown in FIG. 6A, the f-number is 2.81. In FIG. 6B, the astigmatism is shown for both the sagittal image surface S and the tangential image surface T. The half-field angle ω for FIGS. 6B and 6C is 39.2°.

As is clear from the lens data and aberration curves discussed above, in Embodiment 3 the various aberrations are favorably corrected, and performance capabilities, including a wide picture angle, that is, a wide field angle, suitable for use in text imaging camera are achieved.

With the imaging lens of the present invention, constructed as described above, optical performance suitable for a text imaging camera is achieved. For example, by making each of the first lens element and the fifth lens element have aspheric surfaces on both sides, as described in Embodiments 1 and 2 above, the number of lens elements can be reduced compared to the prior art. Further, particularly associated with the fifth lens element including one or more aspheric surfaces, high resolution and high optical performance with low distortion can be maintained across a wide picture angle in an imaging lens of short overall length. Additionally, by making the first lens component have negative refractive power and the second lens component have positive refractive power, the diameters of the lens elements can be kept small. Additionally, by satisfying Condition (1), an appropriate back focus can be secured while maintaining a good balance between the diameters of the lens elements and the aberration correction. In this manner, favorable optical performance can be maintained across a wide picture angle and in an imaging lens that is small compared to prior art imaging lenses.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Additionally, the present invention is not limited to an imaging lens for a text imaging camera but can also be used in imaging devices in general, including cameras, and specifically digital cameras and similar cameras. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens comprising four lens components, arranged in order from the object side, as follows:
    a first lens component of negative refractive power, having an aspheric surface on the image side that is concave near the optical axis, and having an aspheric surface on the object side;
    a second lens component of positive refractive power and having a convex surface on the object side;
    a third lens component of positive refractive power and that includes, in order from the object side, a lens element of positive refractive power and a lens element of negative refractive power;
    a fourth lens component having a surface on the object side that is convex near the optical axis, and having an aspheric surface on the image side that is convex near the optical axis and that becomes concave at the periphery;

wherein
the following condition is satisfied:

$$-1.0 < (P1+P5)/P < -0.4$$

where
P1 is the refractive power of said first lens component,
P5 is the refractive power of said fourth lens component, and
P is the refractive power of the imaging lens.

2. The imaging lens of claim 1, wherein said first lens component consists of a lens element.

3. The imaging lens of claim 2, wherein said second lens component consists of a lens element.

4. The imaging lens of claim 3, wherein said third lens component consists of two lens elements.

5. The imaging lens of claim 4, wherein said fourth lens component consists of a lens element.

6. The imaging lens of claim 1, wherein said four lens components are arranged in order from the object side without any intervening lens element.

7. The imaging lens of claim 6, wherein said first lens component consists of a lens element.

8. The imaging lens of claim 7, wherein said second lens component consists of a lens element.

9. The imaging lens of claim 8, wherein said third lens component consists of two lens elements.

10. The imaging lens of claim 9, wherein said fourth lens component consists of a lens element.

11. The imaging lens of claim 1, wherein said imaging lens consists of four lens components.

12. The imaging lens of claim 11, wherein said first lens component consists of a lens element.

13. The imaging lens of claim 12, wherein said second lens component consists of a lens element.

14. The imaging lens of claim 13, wherein said third lens component consists of two lens elements.

15. The imaging lens of claim 14, wherein said fourth lens component consists of a lens element.

16. The imaging lens of claim 1, wherein said fourth lens component is formed of optical glass.

17. The imaging lens of claim 16, wherein said four lens components are arranged in order from the object side without any intervening lens element.

18. The imaging lens of claim 17, wherein said imaging lens consists of four lens components.

19. The imaging lens of claim 18, wherein said imaging lens consists of five lens elements.

20. The imaging lens of claim 16, wherein said fourth lens component consists of a lens element.

* * * * *